United States Patent
Bonakdar et al.

(10) Patent No.: US 11,480,836 B2
(45) Date of Patent: Oct. 25, 2022

(54) LIQUID CRYSTAL ON SILICON DEVICE WITH MICROLENS

(71) Applicant: OmniVision Technologies, Inc., Santa Clara, CA (US)

(72) Inventors: Alireza Bonakdar, San Jose, CA (US); Libo Weng, San Jose, CA (US); Badrinath Padmanabhan, San Jose, CA (US)

(73) Assignee: Omnivision Technologies, Inc., Santa Clara, CA (US)

( * ) Notice: Subject to any disclaimer, the term of this patent is extended or adjusted under 35 U.S.C. 154(b) by 52 days.

(21) Appl. No.: 16/864,890

(22) Filed: May 1, 2020

(65) Prior Publication Data
US 2021/0341807 A1 Nov. 4, 2021

(51) Int. Cl.
*G02F 1/1362* (2006.01)
*G02F 1/1335* (2006.01)
*G02F 1/1337* (2006.01)
*G02F 1/1343* (2006.01)

(52) U.S. Cl.
CPC ...... *G02F 1/136277* (2013.01); *G02F 1/1337* (2013.01); *G02F 1/13439* (2013.01); *G02F 1/133553* (2013.01); *G02F 1/134309* (2013.01)

(58) Field of Classification Search
CPC ......... G02F 1/136277; G02F 1/133553; G02F 1/1337; G02F 1/134309; G02F 1/13439
USPC ....................................................... 349/113
See application file for complete search history.

(56) References Cited

U.S. PATENT DOCUMENTS

| 6,535,256 B1* | 3/2003 | Ishihara ............ G02F 1/133621 349/113 |
| 9,229,280 B2 | 1/2016 | Fan |
| 10,488,721 B2 | 11/2019 | Fan |
| 2004/0125048 A1* | 7/2004 | Fukuda ............. G02F 1/133526 345/30 |
| 2011/0222006 A1* | 9/2011 | Imanishi ........... G02F 1/133711 349/124 |
| 2016/0334664 A1* | 11/2016 | Zhuang ............. G02F 1/133555 |
| 2018/0219034 A1 | 8/2018 | Fan et al. |
| 2019/0196284 A1 | 6/2019 | Zhang et al. |

(Continued)

OTHER PUBLICATIONS

Zhang et al., "Fundamentals of phase-only liquid crystal on silicon (LCOS) devices," Light: Science & Applications, 2014, vol. 3, 10 pages.

*Primary Examiner* — Edward J Glick
*Assistant Examiner* — David Y Chung
(74) *Attorney, Agent, or Firm* — Christensen O'Connor Johnson Kindness PLLC

(57) ABSTRACT

A liquid crystal on silicon device is described. The liquid crystal on silicon device includes a plurality of mirror electrodes, a transparent electrode, a liquid crystal material, and a plurality of microlenses. The plurality of mirror electrodes are arranged periodically to form an array of pixels, each pixel included in the array of pixels configurable to reflect incident light. The transparent electrode is optically aligned with the plurality of mirror electrodes. The liquid crystal material is disposed between the transparent electrode and the plurality of mirror electrodes. The plurality of microlenses are optically aligned with the plurality of mirror electrodes. Each microlens included in the plurality of microlenses is positioned to focus the incident light on a respective one of the plurality of mirror electrodes.

15 Claims, 6 Drawing Sheets

(56) References Cited

U.S. PATENT DOCUMENTS

2019/0377227 A1   12/2019  Lee
2021/0063788 A1*  3/2021  Okazaki ............ G02F 1/133502
2021/0211564 A1*  7/2021  Liu .................... H01L 31/1136

* cited by examiner

LIQUID CRYSTAL ON SILICON DEVICE WITH MICROLENS

TECHNICAL FIELD

This disclosure relates generally to liquid crystal on silicon devices, and in particular but not exclusively, relates to liquid crystal on silicon microdisplays.

BACKGROUND INFORMATION

Liquid crystal on silicon (LCOS) technology has been developed for image and video display applications, light modulation, and the like. This technology takes advantage of the electrically controllable light-modulating properties of liquid crystal materials while maintaining device compatibility with conventional silicon complementary metal oxide semiconductor technology and corresponding manufacturing techniques. LCOS devices may locally control liquid crystal molecular orientation to alter an amplitude, polarization, or phase of incident light to provide targeted functionality.

LCOS devices that alter a phase of incident light may be utilized as a spatial light modulator with applications in optical switching, beam steering, beam shaping, modal switching, holography, and the like. Additionally, LCOS devices that alter an amplitude or polarization of incident light may be utilized for reflective or transmissive displays including, but not limited to, projectors, near eye displays, and the like. Microdisplays, for example, are high pixel density displays useful for near to eye applications such as 3D augmented reality and/or virtual reality devices.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus and system each including or otherwise related to a LCOS device with microlens. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Figure 1A:
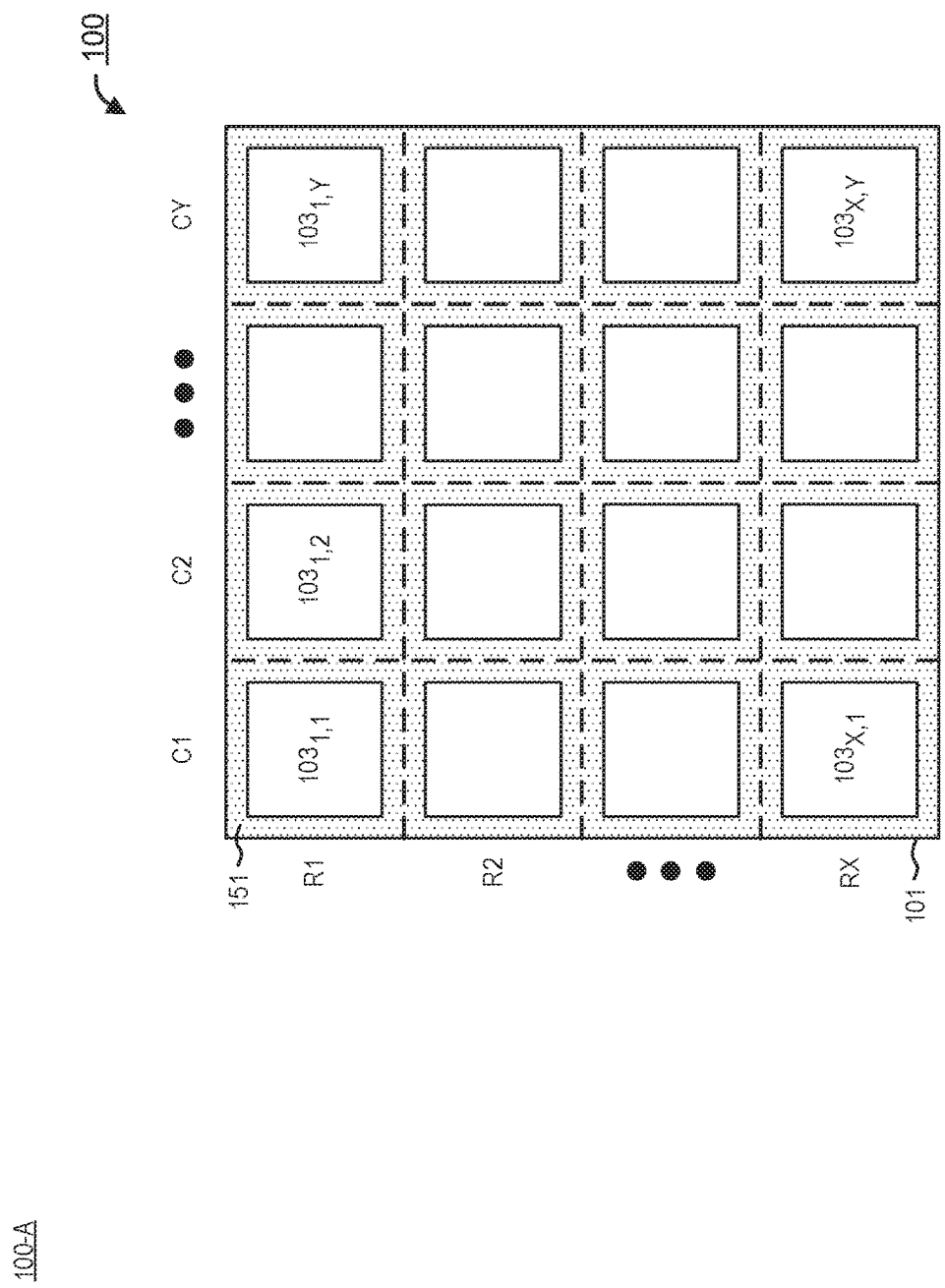
FIG. 1A illustrates a top view of a LCOS device, in accordance with the teachings of the present disclosure.

FIG. 1A illustrates a top view 100-A of LCOS device 100, in accordance with the teachings of the present disclosure. LCOS device 100 includes a plurality of mirror electrodes 103 arranged periodically (e.g., in regular intervals defining rows R1, R2, RX and columns C1, C2, . . . CY) to form an array of pixels. Each of the pixels may generally be defined, at least in part, by the area of a given one of the plurality of mirror electrodes 103 and are each individually addressable and/or configurable to reflect incident light based on a mode (i.e., molecular orientation) of overlying liquid crystal material (see, e.g., FIGS. 2-4). For example, a first pixel 151 of the pixel array may be associated with mirror electrode $103_{1,1}$ located in the first row and column (e.g., R1 and C1, respectively) of the periodic arrangement of the plurality of mirror electrodes 103. The plurality of mirror electrodes 103 are formed in semiconductor substrate 101 (e.g., a silicon wafer) and include metal electrodes (e.g., aluminum, silver, platinum, or any other metal with target reflective properties or coated with a reflective film) of a pre-determined shape (e.g., square, rectangle, octagon, hexagon, and any other shape), thickness (e.g., 100 nm), pitch (e.g., 3.8 μm to 4.5 μm), and separation distance (e.g., 200 nm spacing region between adjacent mirror electrodes). It is appreciated that not every element of LCOS device 100 may be illustrated and/or labeled and that specific parameters provided are merely examples. Thus, in accordance with embodiments of the disclosure, different parameters for thickness, pitch, separation distance, and the like may be utilized.

Figure 1B:
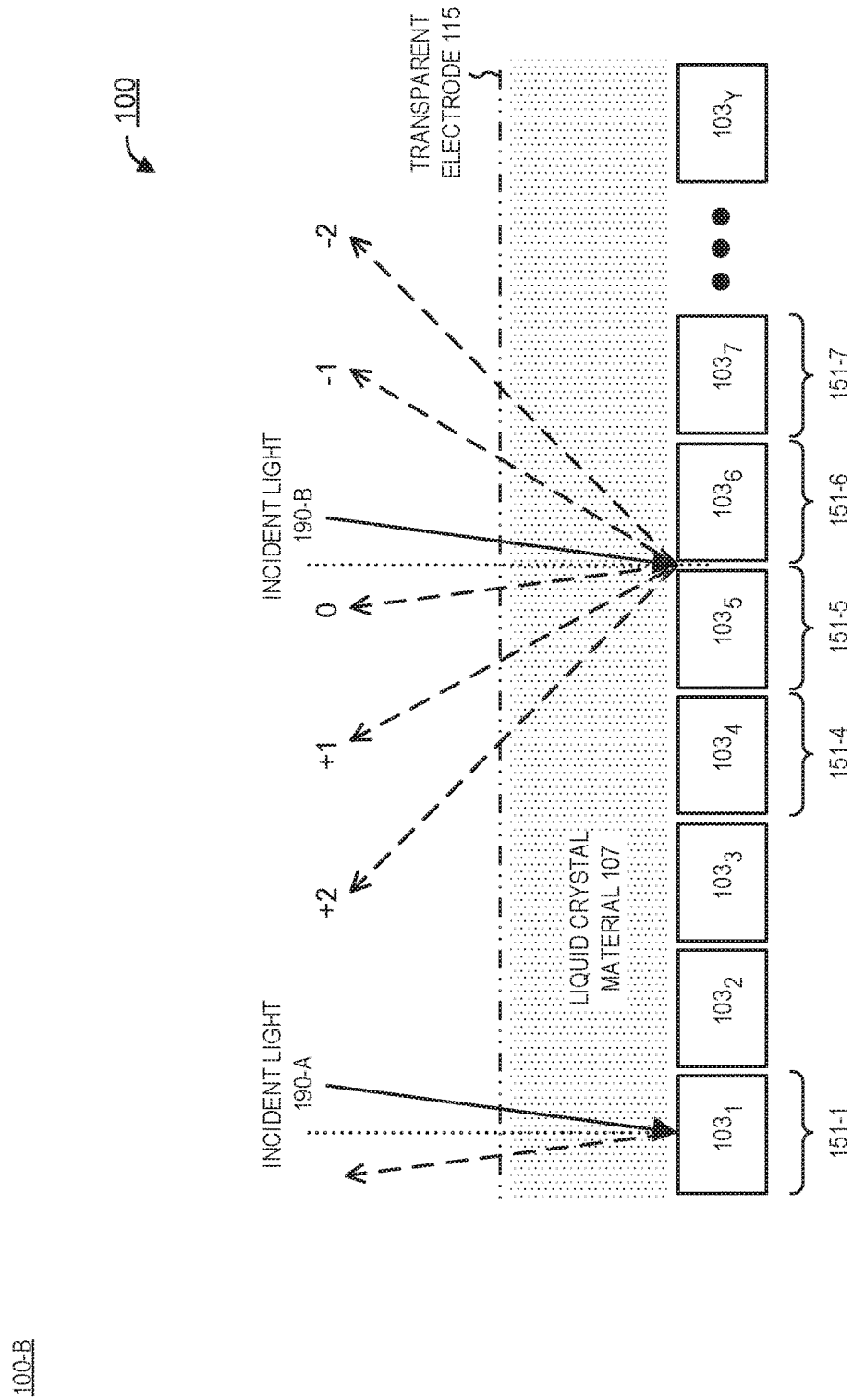
FIG. 1B illustrates a partial cross sectional view of a LCOS device, in accordance with the teachings of the present disclosure.
Figure 3:
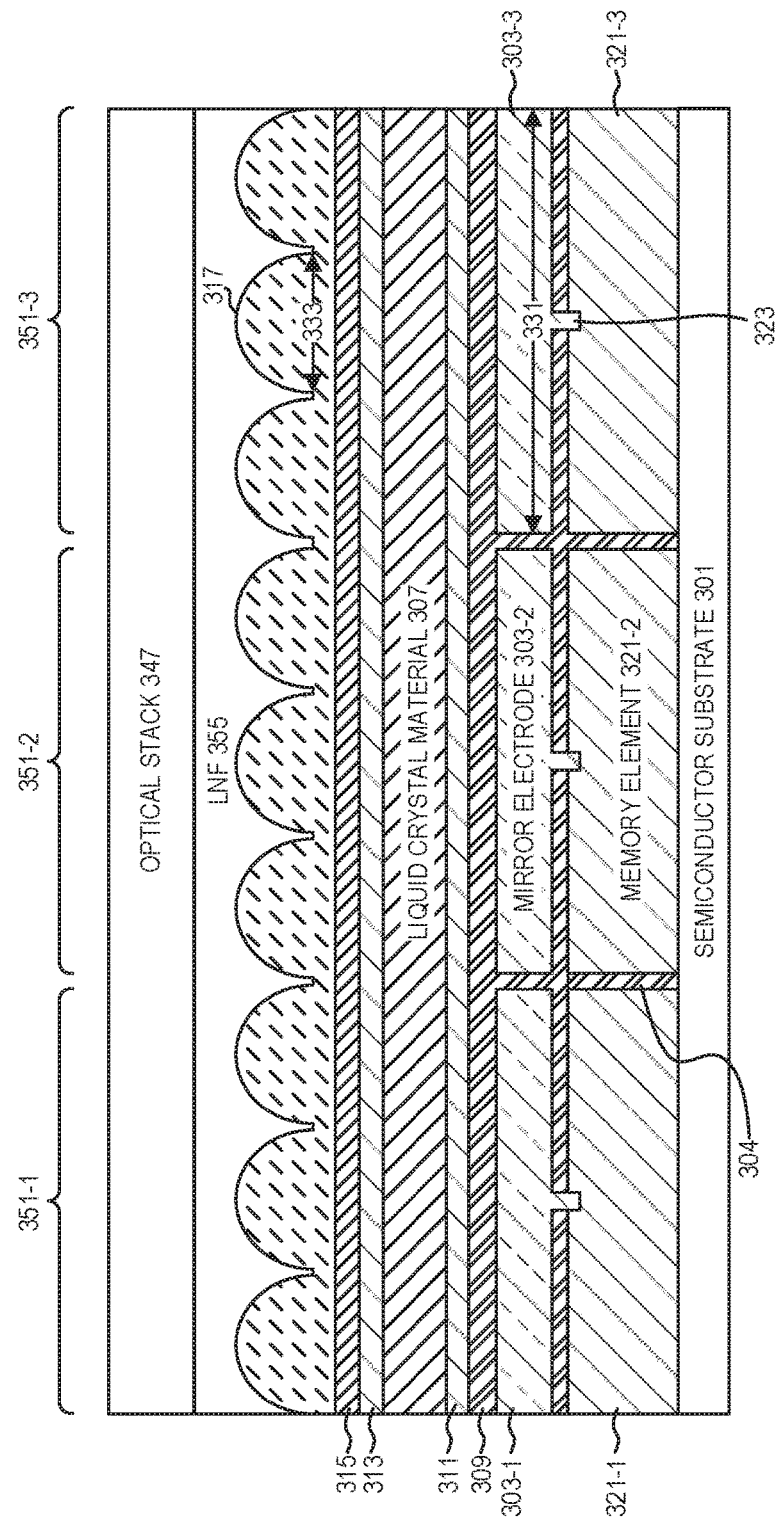
FIG. 3 illustrates a LCOS device with microlens, in accordance with the teachings of the present disclosure.
Figure 4:
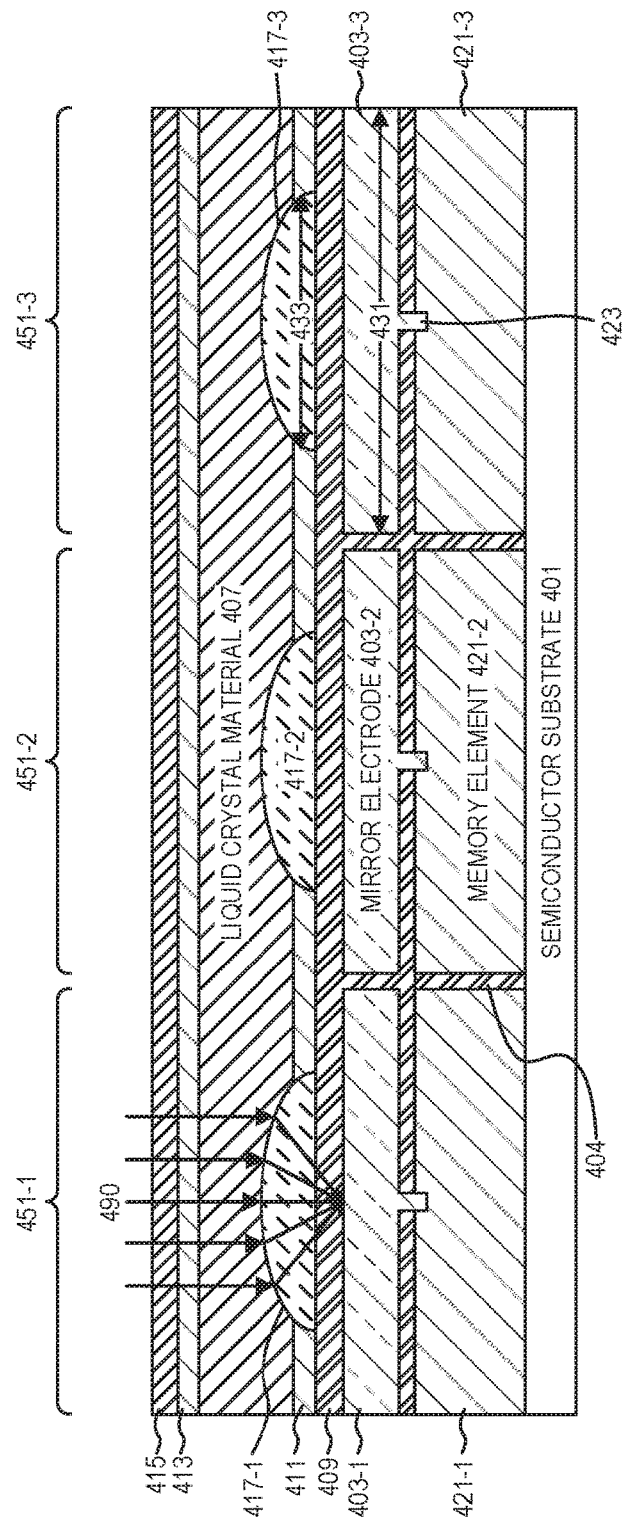
FIG. 4 illustrates a LCOS device with microlens, in accordance with the teachings of the present disclosure.

FIG. 1B illustrates a partial cross sectional view 100-B of LCOS device 100, in accordance with the teachings of the present disclosure. The view 100-B includes a row of the plurality of mirror electrodes 103, liquid crystal material 107, and transparent electrode 115 that collectively form pixels 151 of LCOS device 100. Each of the mirror electrodes 103 is associated with a corresponding one of the pixels 151 (e.g., mirror electrode $103_1$ is associated with pixel 151-1). For the sake of discussion, certain elements of LCOS device 100 have been omitted (e.g., alignment layers, one or more oxides, microlenses, transparent electrode, circuitry, and the like), but more detailed implementations of LCOS device 100 are illustrated in FIG. 2-4.

As illustrated in FIG. 1B, incident light 190 strikes different regions of the row of mirror electrodes 103. The incident light 190 and resulting reflection or diffraction may be modulated on a per-pixel basis based on a local electric field generated between individual mirror electrodes (e.g., $103_1$, $103_2$, $103_3$, and the like) included in the plurality of mirror electrodes 103 and the transparent electrode 115. More specifically, an average molecular orientation of the liquid crystal material 107 may be locally configured or otherwise controlled based on the local electric field generated by a potential difference between a given one of the mirror electrodes 103 and the transparent electrode 115. Incident light ray 190-A, for example, strikes and is subsequently reflected off a surface of mirror electrode $103_1$. As the incident light ray 190-A is generally within an area defined by pixel 151-1, or more specifically mirror electrode $103_1$, then the incident light ray 190-A and the resultant reflection may effectively be modulated (e.g., in terms of amplitude, phase, and/or polarization) by pixel 151-1.

However, when the incident light ray 190-B strikes a region between adjacent mirror electrodes (e.g., between mirror electrodes $103_5$ and $103_6$), the plurality or mirror electrodes 103 act as a diffraction grating, which may result in parasitic higher order diffraction (e.g., +2, +1, −1, +2) and/or lateral oscillations (e.g., reflection of incident light between the adjacent mirror electrodes) that reduce the optical performance of LCOS device 100 (e.g., in terms of contrast, clarity, and the like). The higher order diffraction or reflection, as illustrated, may extend over a region defined by several pixels leading to loss in optical performance. In order to reduce or otherwise mitigate parasitic higher order diffraction and/or lateral oscillation, embodiments of the present disclosure utilize one or more microlenses positioned to direct and focus incident light on the surface of the plurality of mirror electrodes 103 to minimize or otherwise reduce the interaction between incident light and spacing regions disposed between adjacent mirror electrodes.

Figure 2:
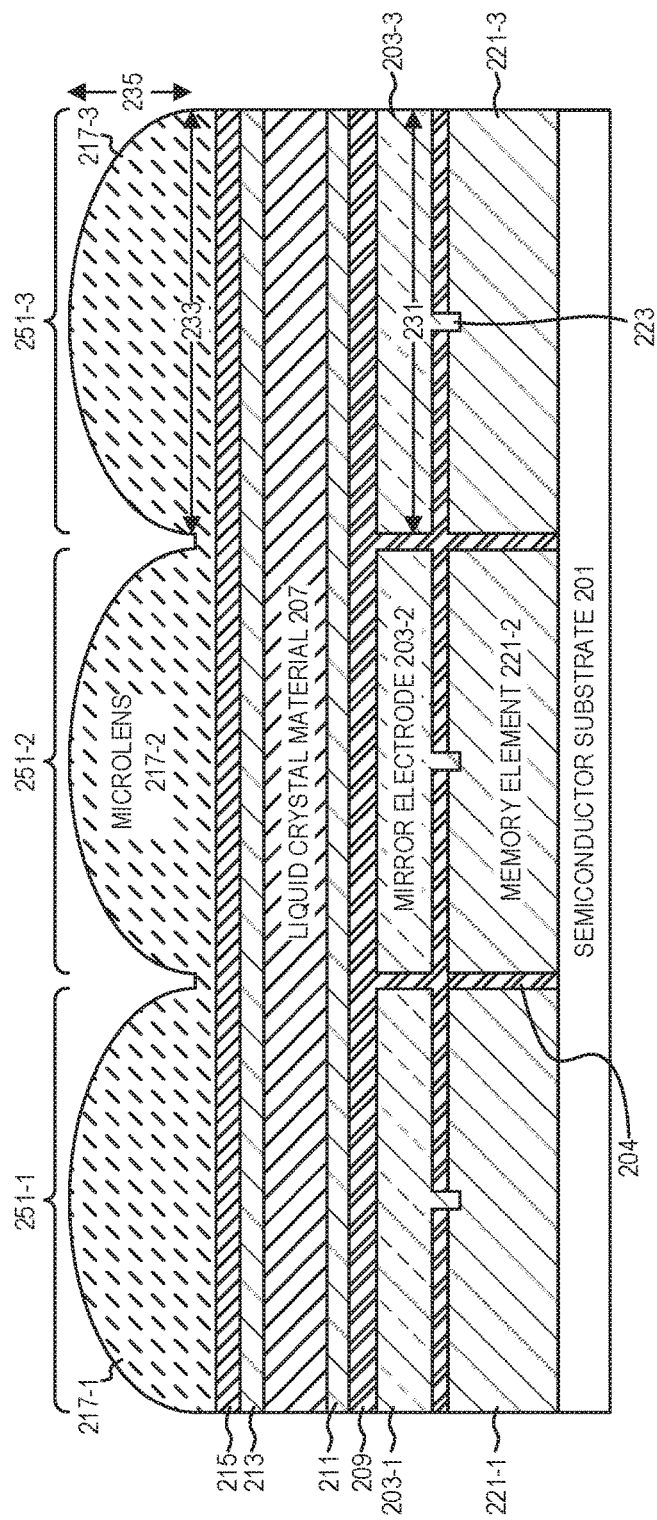
FIG. 2 illustrates a LCOS device with microlens, in accordance with the teachings of the present disclosure.

FIG. 2 illustrates a cross sectional view of LCOS device 200 with microlens, in accordance with the teachings of the present disclosure. LCOS device 200 is one possible implementation of LCOS device 100 illustrated in FIGS. 1A-1B adapted to have reduced lateral oscillations and parasitic higher order reflections and may include features of any LCOS device discussed in embodiments herein (e.g., LCOS device 300 of FIG. 3 and LCOS device 400 of FIG. 4).

In the illustrated embodiment of FIG. 2, LCOS device 200 includes a semiconductor substrate 201 (e.g., a silicon substrate), a plurality of mirror electrodes 203 (e.g., aluminum, silver, platinum, and the like), liquid crystal material 207 (nematic, ferroelectric, and the like), one or more oxide materials 209 (e.g., silicon oxide, silicon oxynitride, and the like), a first alignment material 211 (e.g., polyimide), a second alignment material 213 (e.g., polyimide), a transparent electrode 215 (e.g., indium tin oxide, zinc oxide, other transparent conductive oxides, polymers, and the like, or combinations thereof), a plurality of microlenses 217 (e.g., plastic, polymer, fused silica, silicon, and the like), a plurality of memory elements 221 (e.g., dynamic random access memory, static random access memory, or other types of memory), and a plurality of interconnects 223 (e.g., same or different conductive material of the plurality of mirror electrodes 203).

The plurality of mirror electrodes 203 are arranged periodically (e.g., at regular intervals as shown in FIG. 1A) to form the array of pixels 251. Each of the pixels 251 of LCOS device 200 are individually addressable and capable of modulating light incident on a respective mirror electrode 203 of a given pixel. The liquid crystal material 207 is disposed between the transparent electrode 215 and the plurality of mirror electrodes 203. In some embodiments the transparent electrode 215 is a continuous electrode and has a length, width, and shape that extends over a cumulative region that is optically aligned with the plurality of mirror electrodes 203, which allows for the generation of local electric fields controllable on a per-pixel basis. For example, pixel 251-1 is addressable via memory element 221-1, which is coupled to mirror electrode 203-1 and may determine a potential difference between mirror electrode 203-1 and transparent electrode 215. The potential difference between electrode 203-1 and transparent electrode 215 generates a local electric field (or lack thereof) that controls a molecular orientation of the liquid crystal material 207 disposed within a region defined by mirror electrode 203-1 (e.g., the portion of liquid crystal material 207 disposed between mirror electrode 203-1 and transparent electrode 215). Light incident upon mirror electrode 203-1 and the subsequent reflection may be modulated (e.g., in terms of polarization, phase, and/or amplitude) based on the molecular orientation of the liquid crystal material 207.

Other components of LCOS device 200 facilitate operation. Alignment material 211 is disposed between the oxide material 209 and the liquid crystal material 207 (e.g., liquid crystal material 207 directly contacts alignment material 209). Similarly, alignment material 213 is disposed between the transparent electrode 215 and the liquid crystal material 207 (e.g. liquid crystal material 207 directly contacts alignment material 213). The alignment materials 209 and 213 form a layer that may provide a target surface energy, influence the dynamics of the liquid crystal response to the local electric field, and/or control pre-tilt angle of the molecules of the liquid crystal material 207. The one or more oxide materials 209 are disposed between the liquid crystal material 207 and the plurality of mirror electrodes 203 to electrically isolate the plurality of mirror electrodes 203 from the liquid crystal 207.

The plurality of microlenses 217 are shaped and positioned proximate to the plurality of mirror electrodes 203 to direct incident light away from spacing regions (e.g., trenches 204) between adjacent mirror electrodes included in the plurality of mirror electrodes 203 to reduce lateral oscillations and parasitic higher order diffraction of the incident light. This is achieved, at least in part, by optically aligning the plurality of microlenses 217 with the plurality of mirror electrodes 203. More specifically, each microlens included in the plurality of microlenses 217 is positioned, shaped, and/or arranged to focus the incident light on a respective one of the plurality of mirror electrodes 203 (e.g., microlens 217-1 has a focal point aligned with a center of the surface of mirror electrode 203-1 for pixel 251-1). Thus, each pixel included in the array of pixels 251 includes at least one corresponding mirror electrode included in the plurality of mirror electrodes 203 and at least one corresponding microlens included in the plurality of microlenses 217 that is optically aligned with the corresponding mirror electrode (e.g., pixel 251-1 includes microlens 217-1 that is optically aligned with and focuses incident light on mirror electrode 203-1)

In some embodiments, the proper focus may be achieved by structuring the plurality of microlenses 217 to have a first height 235 that is approximately half of a first lateral length 231 of each of the plurality of mirror electrodes 203. In the same or other embodiments, the first lateral length 231 of each of the plurality of mirror electrodes 203 is greater than or each to a second lateral length 233 of each of the plurality of microlenses 217. The first lateral length 231, the second lateral length 233, and the first height 235 may respectively describe critical dimensions of the plurality of mirror electrodes 203 and the plurality of microlenses 217. In the illustrated embodiment, there is an exactly one-to-one correspondence between the plurality of mirror electrodes 203 and the plurality of microlenses 217.

In the illustrated embodiment, the transparent electrode 215 is disposed between the liquid crystal material 207 and the plurality of microlenses 217. Additionally, the plurality of mirror electrodes 203 are disposed between the plurality of microlenses 217 and the plurality of memory elements 221 that are each coupled to a respective one of the mirror electrodes included in the plurality of mirror electrodes 203 (e.g., memory element 221-1 is coupled to mirror electrode 203-1 such that pixel 251-1 is individually addressable). However, in other embodiments, different configurations may be utilized (see, e.g., FIG. 3 and FIG. 4).

It is appreciated that FIG. 2 may not illustrate every element of LCOS device 200. For example, in some embodiments, the transparent electrode 215 may be deposited on a surface of a glass substrate facing the alignment material 213, which may be utilized to seal or otherwise encapsulate the liquid crystal material 207 between the transparent electrode 215 and the plurality of mirror electrodes 203. In the same or other embodiments, the one or more oxide materials may include a first oxide material (e.g., silicon oxynitride) disposed in trenches 204 between adjacent mirror electrodes included in the plurality of mirror electrodes 203 and a second oxide material (e.g., silicon oxide) disposed as a layer between the alignment layer 211 and the plurality of mirror electrodes 203.

FIG. 3 illustrates a cross sectional view of LCOS device 300 with microlens, in accordance with the teachings of the present disclosure. LCOS device 300 is one possible implementation of LCOS device 100 illustrated in FIGS. 1A-1B adapted to have reduced lateral oscillations and parasitic higher order reflections and may include features of any LCOS device discussed in embodiments herein (e.g., LCOS device 200 of FIG. 2 and LCOS device 400 of FIG. 4).

In the illustrated embodiment of FIG. 3, LCOS device 300 includes semiconductor substrate 301, plurality of mirror electrodes 303, liquid crystal material 307, one or more oxide materials 309, first alignment material 311, second alignment material 313, transparent electrode 315, plurality of microlenses 317, plurality of memory elements 321, and plurality of interconnects 323, which collectively form array of pixels 351 and may be similar to the liked named elements illustrated in FIG. 2. LCOS device 300 of FIG. 3 is similar to LCOS device 200 of FIG. 2 in many respects, but has at least a different microlens configuration and further includes a low N material or film (LNF) 355 and optical stack 347.

As illustrated in FIG. 3, there is at least a two-to-one correspondence between the plurality of microlenses 317 and the plurality of mirror electrodes 303. For example, in the illustrated embodiment, there are exactly three microlenses for every mirror electrode. Thus, the first lateral length 331 of each of the plurality of mirror electrodes 303 is approximately three times greater than the second lateral length 333 of each of the plurality of microlenses 317. Additionally, the plurality of microlenses 317 are disposed between the LNF 355 and the plurality of mirror electrodes 303. The LNF 355 has a first refractive index that is less than a second refractive index of the plurality of microlenses 317. In one embodiment, the first refractive index of the LNF 355 is approximately 1.44. In the same or other embodiments, the second refractive index of the plurality of microlenses 317 is approximately 1.66, which may be comparable to a third refractive index of a glass substrate (not illustrated) disposed between the plurality of microlenses and the transparent electrode 315. In some embodiments, LNF 355 is a polymer based material. The plurality of microlenses 317 are also disposed between the optical stack 347 and the plurality of mirror electrodes 303. The optical stack includes at least one of a compensator, an achromatic linear to circular converter plate, or a polarizer. The compensator alters a polarization state of light and may be a half-wave plate, a quarter-wave plate, and the like. The achromatic linear to circular converter plate may alter a polarization state of light between linear and circular polarizations. The polarizer may be an optical filter that transmits portions of incident light of a specific polarization state while reflecting other portions of the incident light having a different polarization state than the transmitted portions of the incident light.

FIG. 4 illustrates a cross sectional view of LCOS device 400 with microlens, in accordance with the teachings of the present disclosure. LCOS device 400 is one possible implementation of LCOS device 100 illustrated in FIGS. 1A-1B adapted to have reduced lateral oscillations and parasitic higher order reflections and may include features of any LCOS device discussed in embodiments herein (e.g., LCOS device 200 of FIG. 2 and LCOS device 300 of FIG. 3).

In the illustrated embodiment of FIG. 4, LCOS device 400 includes semiconductor substrate 401, plurality of mirror electrodes 403, liquid crystal material 407, one or more oxide materials 409, first alignment material 411, second alignment material 413, transparent electrode 415, plurality of microlenses 417, plurality of memory elements 421, and plurality of interconnects 423, which collectively form array of pixels 451 and may be similar to the liked named elements of FIG. 2. LCOS device 400 is similar to LCOS device 200 of FIG. 2 in many respects, but has at least a different microlens and alignment layer configuration.

As illustrated in FIG. 4, the plurality of microlenses 417 are disposed between the liquid crystal material 407 and the plurality of mirror electrodes 403. In some embodiments, the plurality of microlenses 417 directly contact the one or more oxide materials 409. Thus, the first alignment material 411 may be partially disposed between the one or more oxide materials 409 and the liquid crystal material 407 and further disposed between adjacent microlenses (e.g., between microlens 417-1 and 417-2). In some embodiments, the first alignment material 411 is not disposed between the plurality of microlenses 417 and the liquid crystal material 407. It is further noted that there is exactly a one-to-one correspondence between the plurality of microlenses 417 and the plurality of mirror electrodes 403 with each microlens included in the plurality of microlenses 417 having a focal point centrally positioned on a surface of a corresponding mirror electrode included in the plurality of mirror electrodes 403 (e.g., microlens 417-1 of pixel 451-1 has a focal point that directs incident light 490 towards a surface midpoint of mirror electrode 403-1). In some embodiments, each of the plurality of microlenses 417 has a second lateral length 433 that is approximately half of a first lateral length 431 of each of the plurality of mirror electrodes 403 to achieve a target focal point.

Figure 5:
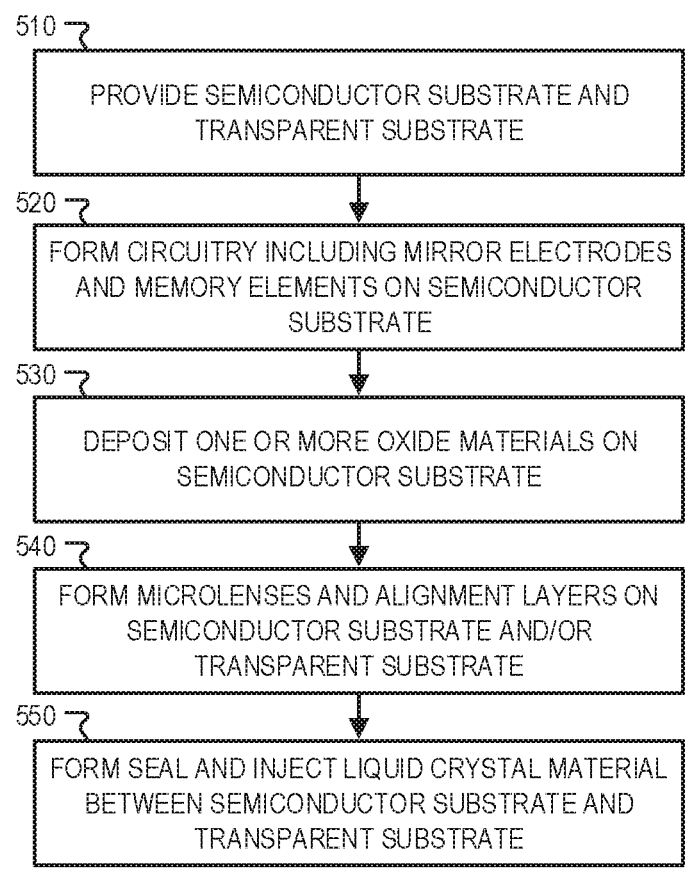
FIG. 5 illustrates an example method for forming a LCOS device with microlens, in accordance with the teachings of the present disclosure.

FIG. 5 illustrates an example method 500 for forming a LCOS device with microlens, in accordance with the teachings of the present disclosure. It is appreciated that the order in which some or all of the process blocks appear in method 500 should not be deemed limiting. Rather, one of ordinary skill in the art having the benefit of the present disclosure will understand that some of the process blocks may be executed in a variety of order not illustrated, or even in parallel.

Block 510 shows providing a semiconductor substrate and a transparent substrate, which may collectively form an LCOS device with microlens when packaged (e.g., sealed together), in accordance with embodiments of the present disclosure. The semiconductor substrate may be a silicon wafer and the transparent substrate may be a glass substrate. A surface of the glass substrate may be patterned (e.g., via photolithography techniques and/or other masking techniques) and a conductive transparent electrode (e.g., indium tin oxide) deposited on the surface of the glass substrate.

Block 520 illustrates forming circuitry including mirror electrodes and memory elements on the semiconductor substrate. The circuitry may be formed using semiconductor processing techniques related to patterning (e.g., photolithography), removal (e.g., wet and/or dry etching such as chemical etching and ion beam etching), deposition (e.g., atomic layer deposition, chemical vapor deposition, physical vapor deposition), and any other suitable technique known by one of ordinary skill in the art. In some embodiments, the plurality of mirror electrodes may be formed in a multistep process in which each of the mirror electrodes include a metal electrode coated with a reflective film.

Block 530 shows depositing one or more oxide materials on the semiconductor substrate. It is appreciated that blocks 520 and 530 may be interrelated and that the one or more oxide materials may require multiple deposition steps which may be interposed between steps of block 520. For example, after forming the plurality of memory elements in block 520, block 530 may proceed with a first deposition process in which a layer of oxide material is formed on top of the memory element. Subsequently, the plurality of mirror electrodes may be formed followed by a second deposition of a layer of oxide material on the plurality of memory electrodes. In some embodiments, there may be a plurality of trenches in the semiconductor each disposed between a pair of adjacent mirror electrodes and memory elements. One or more oxide materials may be deposited to backfill the plurality of trenches.

Block 540 illustrates forming microlenses and alignment layers (e.g., one or more layers of alignment material) on the semiconductor substrate and/or the transparent substrate. Various techniques may be used to form the plurality of microlenses at low temperature with minimal steps of thin film deposition, photolithography, and etching such as reflow and gray scale techniques. The plurality of microlenses may be formed directly on top of the one or more oxide materials (e.g., as shown FIG. 4) of the semiconductor substrate or on top of the glass substrate (e.g., as shown in FIG. 2 and FIG. 3). A first alignment layer may be formed on the semiconductor substrate and a second alignment layer formed on the transparent substrate as shown in embodiments of the present disclosure.

Block 550 shows forming a seal and injecting liquid crystal material between the semiconductor substrate and the transparent substrate. The transparent substrate may be positioned on top of the semiconductor substrate such that the corresponding alignment layers formed of alignment material face one another. The stack may be partially sealed together, liquid crystal material injected, and then fully sealed to encapsulate the liquid crystal material between the plurality of mirror electrodes and the transparent electrodes. In other embodiments a dam of sealant may be formed on a surface of either the semiconductor substrate or the transparent substrate. The liquid crystal material may subsequently be deposited in the region contained by the dam and then the semiconductor substrate and the transparent substrate are brought into contact and sealed together by the dam.

The processes explained above may be implemented using software and/or hardware. The techniques described may constitute machine-executable instructions embodied within a tangible or non-transitory machine (e.g., computer) readable storage medium, that when executed by a machine (e.g., controller 120 of FIG. 1A) will cause the machine to perform the operations described. Additionally, the processes may be embodied within hardware, such as an application specific integrated circuit ("ASIC"), field programmable gate array (FPGA), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A liquid crystal on silicon (LCOS) device, comprising:
a plurality of mirror electrodes arranged periodically to form an array of pixels, wherein each pixel included in the array of pixels is configurable to reflect incident light;
a transparent electrode optically aligned with the plurality of mirror electrodes;
a liquid crystal material disposed between the transparent electrode and the plurality of mirror electrodes;
a plurality of microlenses optically aligned with the plurality of mirror electrodes, wherein each microlens included in the plurality of microlenses is positioned to focus the incident light on a respective one of the plurality of mirror electrodes, wherein each of the plurality of mirror electrodes has a first lateral length, wherein each of the plurality of microlenses has a second lateral length, and wherein the first lateral length is greater than the second lateral length; and
an alignment material disposed between adjacent microlenses included in the plurality of microlenses.

2. The LCOS device of claim 1, wherein each pixel included in the array of pixels includes a corresponding mirror electrode included in the plurality of mirror electrodes and a corresponding microlens included in the plurality of microlenses that is optically aligned with the corresponding mirror electrode.

3. The LCOS device of claim 2, wherein a focal point of the corresponding microlens is centrally positioned on a surface of the corresponding mirror electrode.

4. The LCOS device of claim 1, wherein the plurality of microlenses is disposed between the liquid crystal material and the plurality of mirror electrodes.

5. The LCOS device of claim 4, wherein there is a one-to-one correspondence between the plurality of microlenses and the plurality of mirror electrodes.

6. The LCOS device of claim 4, further comprising:
an oxide material disposed between the liquid crystal material and the plurality of mirror electrodes to electrically isolate the plurality of mirror electrodes from the liquid crystal material, and
wherein the alignment material is further disposed between the oxide material and the liquid crystal material.

7. The LCOS device of claim 6, wherein the alignment material is not disposed between the plurality of microlenses and the liquid crystal material.

8. The LCOS device of claim 6, wherein there is at least a two-to-one correspondence between the plurality of microlenses and the plurality of mirror electrodes.

9. The LCOS device of claim 1, wherein each of the plurality of microlenses has a first height that is approximately half of a first lateral length of each of the plurality of mirror electrodes.

10. The LCOS device of claim 1, wherein one or more of the plurality of microlenses are shaped and positioned proximate to the plurality of mirror electrodes to direct the incident light away from spacing regions located between adjacent mirror electrodes included in the plurality of mirror electrodes to reduce lateral oscillations of the incident light.

11. The LCOS device of claim 1, further comprising:
a low N material, wherein the plurality of microlenses is disposed between the low N material and the plurality of mirror electrodes, and wherein the low N material has a first refractive index that is less than a second refractive index of the plurality of microlenses.

12. The LCOS device of claim 1, further comprising:
an optical stack including at least one of a compensator, an achromatic linear to circular converter plate, or a polarizer, and wherein the plurality of microlenses is disposed between the optical stack and the plurality of mirror electrodes.

13. The LCOS device of claim 1, further comprising:
a plurality of memory elements coupled to the plurality of mirror electrodes, and wherein the plurality of mirror electrodes is disposed between the plurality of microlenses and the plurality of memory elements.

14. A liquid crystal on silicon (LCOS) device, comprising:
a plurality of mirror electrodes arranged periodically to form an array of pixels, wherein each pixel included in the array of pixels is configurable to reflect incident light;
a transparent electrode optically aligned with the plurality of mirror electrodes;
a liquid crystal material disposed between the transparent electrode and the plurality of mirror electrodes;
a plurality of microlenses optically aligned with the plurality of mirror electrodes, wherein each microlens included in the plurality of microlenses is positioned to focus the incident light on a respective one of the plurality of mirror electrodes;
an alignment material disposed between adjacent microlenses included in the plurality of microlenses; and
a low N material, wherein the plurality of microlenses is disposed between the low N material and the plurality of mirror electrodes, and wherein the low N material has a first refractive index that is less than a second refractive index of the plurality of microlenses.

15. The LCOS device of claim 14, further comprising:
an oxide material disposed between the liquid crystal material and the plurality of mirror electrodes to electrically isolate the plurality of mirror electrodes from the liquid crystal material, wherein the alignment material is further disposed between the oxide material and the liquid crystal material.

* * * * *